United States Patent [19]

Vanmaele et al.

[11] Patent Number: 5,021,393
[45] Date of Patent: Jun. 4, 1991

[54] CYAN DYES IN DYE-DONOR ELEMENTS FOR THERMAL DYE TRANSFER

[75] Inventors: Luc J. Vanmaele, Lochristi; Wilhelmus Janssens, Aarschot, both of Belgium

[73] Assignee: Agfa-Gevaert, N.V., Mortsel, Belgium

[21] Appl. No.: 509,176

[22] Filed: Apr. 16, 1990

[30] Foreign Application Priority Data

Apr. 25, 1989 [EP] European Pat. Off. ........ 89201082.8

[51] Int. Cl.$^5$ ..................... B41M 5/035; B41M 5/26
[52] U.S. Cl. ..................................... 503/227; 8/471; 428/195; 428/480; 428/913; 428/914
[58] Field of Search .................. 8/471; 428/195, 480, 428/913, 914

[56] References Cited

U.S. PATENT DOCUMENTS 4,695,287 9/1987 Evans et al. ..................... 503/227

Primary Examiner—Bruce H. Hess
Attorney, Agent, or Firm—Breiner & Breiner

[57] ABSTRACT

Dye-donor element for use according to thermal dye transfer methods, said element comprising a support having thereon a dye/binder layer comprising a 1,4-quinonediimine cyan dye, which may carry a fused on aromatic, alicyclic, or heterocyclic ring system, wherein the hydrogen atom of the 1-imino function is substituted by a carboxylic acyl group, a substituted carboxylic acid group, an alkyl ester group, a substituted alkyl ester group, an aryl ester group, a substituted aryl ester group, a carbamoyl group, a substituted carbamoyl group, a substituted phosphono group, a substituted phosphinyl group, a substituted sulphonyl group, a sulpho group, a substituted sulpho group, a sulphamoyl group, or a substituted sulphamoyl group, the hydrogen atom of the 4-imino function being substituted by a p-aminoaryl group or a substituted p-aminoaryl group.

6 Claims, No Drawings

CYAN DYES IN DYE-DONOR ELEMENTS FOR THERMAL DYE TRANSFER

BACKGROUND OF THE INVENTION

1. Field of the Invention

The present invention relates to dye-donor elements for use according to thermal dye transfer methods, in particular to dye-donor elements comprising cyan dyes that have a good hue and favourable stability.

2. Description of the Prior Art

Thermal transfer methods have been developed to make prints from electronic pattern information signals e.g. from pictures that have been generated electronically by means of a colour video camera. To make such prints the electronic picture can be subjected to colour separation with the aid of colour filters. The different colour selections thus obtained can then be converted into electric signals, which can be processed to form cyan, magenta, and yellow electrical signals. The resulting electrical colour signals can then be transmitted to a thermal printer. To make the print a dye-donor element having repeated separate blocks of cyan, magenta, and yellow dye is placed in face-to-face contact with a receiving sheet and the resulting sandwich is inserted between a thermal printing head and a platen roller. The thermal printing head, which is provided with a plurality of juxtaposed heat-generating resistors, can selectively supply heat to the back of the dye-donor element. For that purpose it is heated up sequentially in correspondence with the cyan, magenta, and yellow electrical signals, so that dye from the selectively heated regions of the dye-donor element is transferred to the receiver sheet and forms a pattern thereon, the shape and density of which are in accordance with the pattern and intensity of the heat supplied to the dye-donor element.

The dye-donor element usually comprises a very thin support e.g. a polyester support, which is coated on both sides with an adhesive or subbing layer, one adhesive or subbing layer being covered with a slipping layer that provides a lubricated surface against which the thermal printing head can pass without suffering abrasion, the other adhesive layer at the opposite side of the support being covered with a dye/binder layer, which contains the printing dyes in a form that can be released in varying amounts depending on, as mentioned above, how much heat is applied to the dye-donor element.

A great many of dyes are known, which can be used in dye-donor elements for use according to thermal dye transfer methods. Among these are those described in e.g. EP-A No. 209,990, EP-A No. 209,991, EP-A No. 216,483, EP-A No. 218,397, EP-A No. 227,095, EP-A No. 227,096, EP-A No. 229,374, EP-A No. 257,577, EP-A No. 257,580, JP No. 84/78894, JP No. 84/78895, JP No. 84/78896, JP No. 84/227,490, JP No. 84/227,948, JP No. 85/27594, JP No. 85/30391, JP No. 85/229,787, JP No. 85/229,789, JP No. 85/229,790, JP No. 85/229,791, JP No. 85/229,792, JP No. 85/229,793, JP No. 85/229,795, JP No. 86/41596, JP No. 86/268,493, JP No. 86/268,494, JP No. 86/268,495, and JP No. 86/284,489.

Many of the dyes proposed for use in thermal dye transfer do not have a fully satisfying spectral absorption and extinction coefficient, or they are not sufficiently stable to light.

Outside the art of thermal dye transfer naphthoquinonediimide dyes are known from EP-A No. 0,095,899. They are formed from carboxamidonaphthalene dye precursor compounds in a silver halide photographic material by cross-oxidation during development of the silver halide. In Research Disclosure 22219 (October 1982) p. 350-2 colour-forming carboxamidonaphthalene and carboxamidodiphenylamine dye precursors and carboximide dyes have been described for the same purpose.

SUMMARY OF THE INVENTION

It is an object of the present invention to provide a dye-donor element comprising in the dye/binder layer a cyan dye that has a good hue and a favourable stability to light.

This and other objects are achieved by providing a dye-donor element for use according to thermal dye transfer methods, said element comprising a support having thereon a dye/binder layer comprising a cyan dye carried by a polymeric binder resin, characterized in that said cyan dye is a 1,4-quinonediimine or 1,4-quinonediimine carrying on the quinone ring structure a fused on aromatic ring system, substituted aromatic ring system, alicyclic ring system, substituted alicyclic ring system, heterocyclic ring system, or substituted heterocyclic ring system, the hydrogen atom of the 1-imino function being substituted by a carboxylic acyl group, a substituted carboxylic acyl group, an alkyl ester group, a substituted alkyl ester group, an aryl ester group, a substituted aryl ester group, a carbamoyl group, a substituted carbamoyl group, a substituted phosphono group, a substituted phosphinyl group, a substituted sulphonyl group, a sulpho group, a substituted sulpho group, a sulphamoyl group, or a substituted sulphamoyl group, the hydrogen atom of the 4-imino function being substituted by a p-aminoaryl group or a substituted p-aminoaryl group.

DETAILED DESCRIPTION OF THE INVENTION

The dye-donor element according to the present invention comprises a support, which is preferably coated on both sides with an adhesive layer, one adhesive layer being covered with a slipping layer to prevent the thermal printing head from sticking to the dye-donor element, the other adhesive layer at the opposite side of the support being covered with a dye/binder layer, which contains the printing dyes in differently coloured dye/binder areas in a form that can be released in varying amounts depending on, as mentioned above, how much heat is applied to the dye-donor element, said differently coloured dye/binder areas including cyan dye/binder areas, the cyan dyes of which are of the class of 1,4-quinonediimines or 1,4-quinonediimines carrying on the quinone ring structure a fused on aromatic ring system, substituted aromatic ring system, alicyclic ring system, substituted alicyclic ring system, heterocyclic ring system, or substituted heterocyclic ring system, the hydrogen atom of the 1-imino function being substituted by a carboxylic acyl group, a substituted carboxylic acyl group, an alkyl ester group, a substituted alkyl ester group, an aryl ester group, a substituted aryl ester group, a carbamoyl group, a substituted carbamoyl group, a substituted phosphono group, a substituted phosphinyl group, a substituted sulphonyl group, a sulpho group, a substituted sulpho group, a sulphamoyl group, or a substituted sulphamoyl group, the hydrogen atom of the 4-imino function being substituted by a p-aminoaryl group or a substituted p-aminoaryl group.

According to a preferred embodiment of the invention the cyan dyes have the following general formula I:

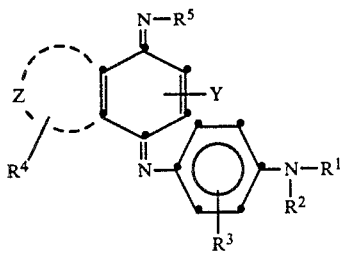

wherein:
- each of $R^1$ and $R^2$ represents a $C_1$-$C_8$ alkyl group, a substituted $C_1$-$C_8$ alkyl group, a cycloalkyl group, a substituted cycloalkyl group, an aryl group, or a substituted aryl group, or $R^1$ and $R^2$ together represent the atoms necessary for completing a heterocyclic nucleus or substituted heterocyclic nucleus, or $R^1$ and/or $R^2$ together with $R^3$ represent the atoms necessary for completing a heterocyclic nucleus fused-on or a substituted heterocyclic nucleus fused-on, $R^1$ and $R^2$ being same or different,
- $R^3$ is a substituent in ortho- or meta-position and is hydrogen, a halogen atom, a $C_1$-$C_8$ alkyl group, a substituted $C_1$-$C_8$ alkyl group, a $C_1$-$C_8$ alkyloxy group, a substituted $C_1$-$C_8$ alkyloxy group, nitro, cyano, an acylamino group, a substituted acylamino group (e.g. —NHCO—R' and —NHSO$_2$—R'), a —CONH—R' group, or a —SO$_2$NH—R' group, in which R' stands for an alkyl group, a substituted alkyl group, a cycloalkyl group, a substituted cycloalkyl group, an aryl group, or a substituted aryl group, or $R^3$ together with $R^1$ and/or $R^2$ represents the atoms necessary for completing a heterocyclic nucleus fused-on or substituted heterocyclic nucleus fused-on,
- Z represents hydrogen atoms or represents the atoms necessary for completing a fused on aromatic ring system, alicyclic ring system, or heterocyclic ring system,
- $R^4$ is hydrogen, a halogen atom, a $C_1$-$C_8$ alkyl group, a substituted $C_1$-$C_8$ alkyl group, a $C_1$-$C_8$ alkyloxy group, a substituted $C_1$-$C_8$ alkyloxy group, nitro, cyano, a —NHCO—R'' group, a —NHSO$_2$—R'' group, a —CONH—R'' group, a —SO$_2$NH—R'' group, or a —SO$_3$—R'' group, in which R'' stands for an alkyl group, a substituted alkyl group, a cycloalkyl group, a substituted cycloalkyl group, an aryl group, or a substituted aryl group,
- Y is hydrogen, a halogen atom such as chloro, cyano, a $C_1$-$C_8$ alkyl group, a substituted $C_1$-$C_8$ alkyl group, a $C_1$-$C_8$ alkyloxy group, a substituted $C_1$-$C_8$ alkyloxy group, a —NHCO—$R^6$ group, a —NHCOO—$R^6$ group, a —NHCON—$R^6R^7$ group, a —SO$_2$NH—$R^6$ group, a —NHSO$_2$—$R^6$ group, a —COOR$^6$ group, or a —CON—$R^6R^7$ group, $R^6$ standing for a $C_1$-$C_8$ alkyl group, a substituted $C_1$-$C_8$ alkyl group, a cycloalkyl group, a substituted cycloalkyl group, an aryl group, or a substituted aryl group, $R^7$ having one of the significances given for $R^6$; and $R^6$ and $R^7$ having a same or different meaning,
- $R^5$ is a monovalent function corresponding to one of the following formulae:

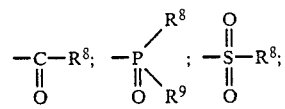

wherein:
- $R^8$ is a $C_1$-$C_8$ alkyl group, a substituted $C_1$-$C_8$ alkyl group, a cycloalkyl group, a substituted cycloalkyl group, an aryl group, a substituted aryl group, an alkenyl group, a substituted alkenyl group, an aralkyl group, a substituted aralkyl group, a heterocyclic group, a substituted heterocyclic group, an alkyloxy group, a substituted alkyloxy group, an aryloxy group, a substituted aryloxy group, an alkylthio group, a substituted alkylthio group, an arylthio group, a substituted arylthio group, an amino group, or a substituted amino group, or $R^8$ and $R^4$ together complete a heterocyclic ring fused-on, and
- $R^9$ has one of the significances given for $R^8$; and $R^8$ and $R^9$ have a same or different meaning or $R^8$ and/or $R^9$ stand for the atoms necessary to complete a five-membered or six-membered heterocyclic ring.

Representative examples of cyan 1,4-quinonediimine dyes that can be used in accordance with the present invention are listed in the following Table 1.

TABLE 1

C.01

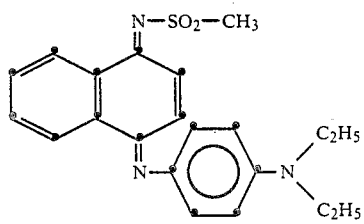

TABLE 1-continued
C.02 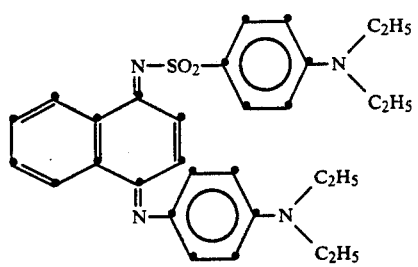
C.03 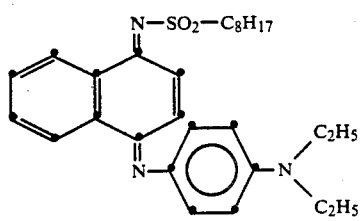
C.04 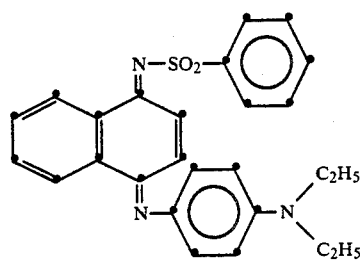
C.05 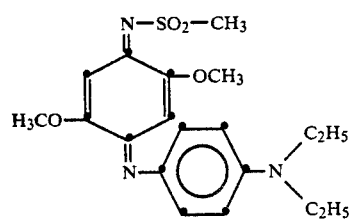
C.06 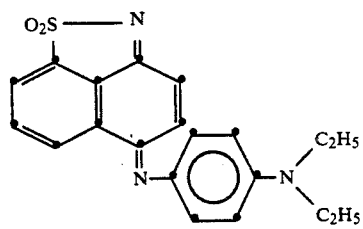
C.07 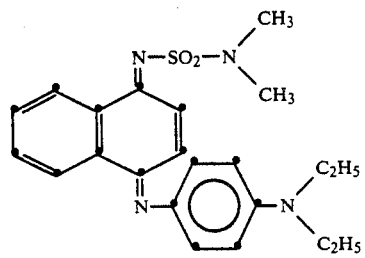

TABLE 1-continued
C.08
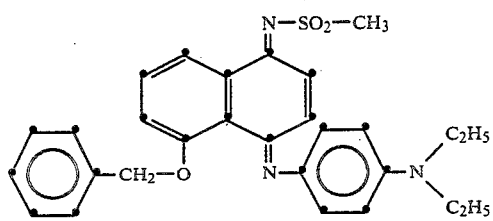
C.09
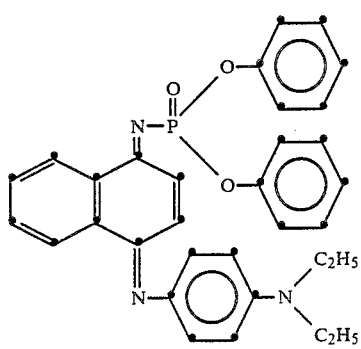
C.10
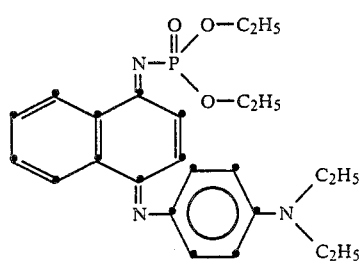
C.11
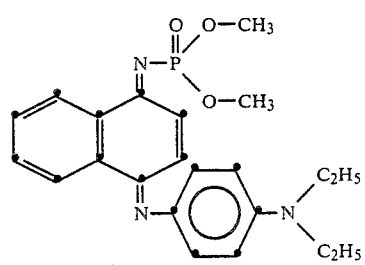
C.12
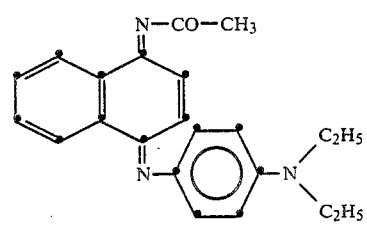
C.13
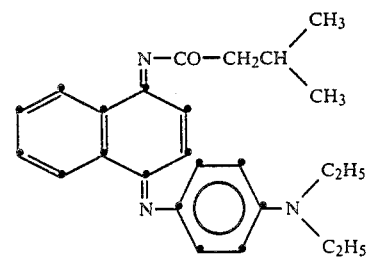

TABLE 1-continued
C.14
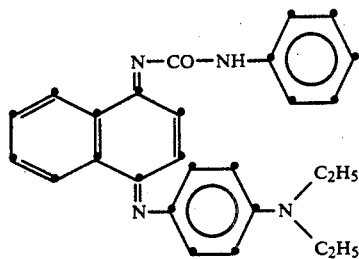
C.15
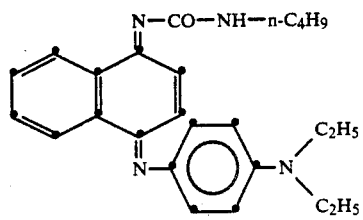
C.16
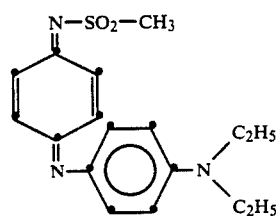
C.17
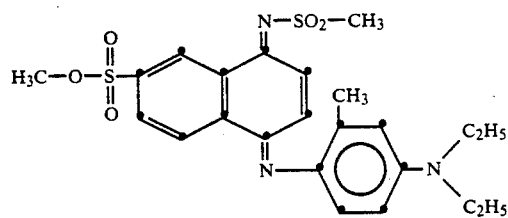
C.18
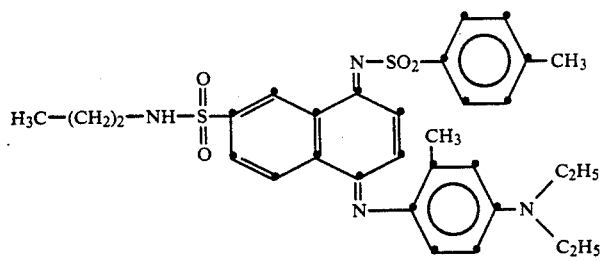
C.19
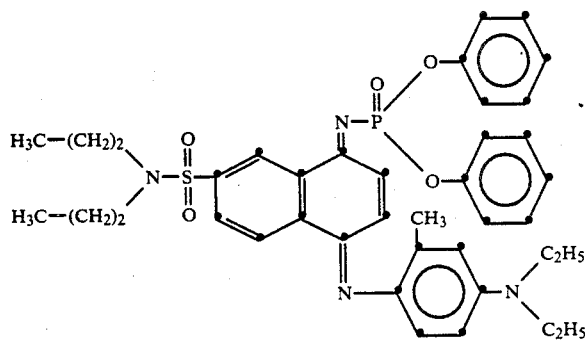

TABLE 1-continued
C.20
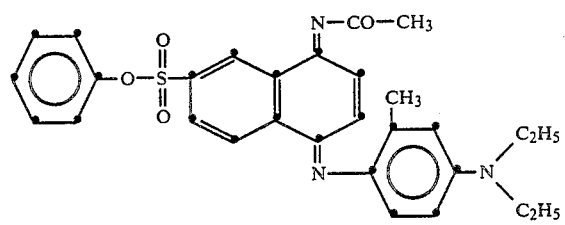
C.21
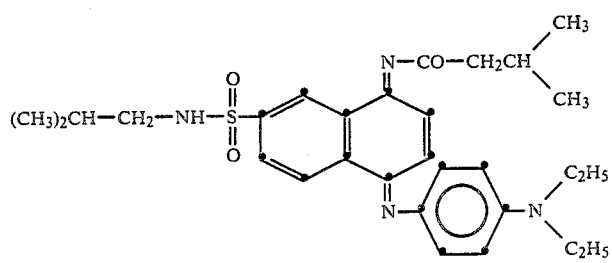
C.22
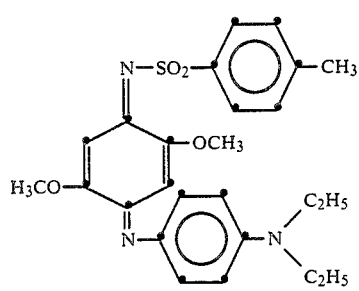
C.23
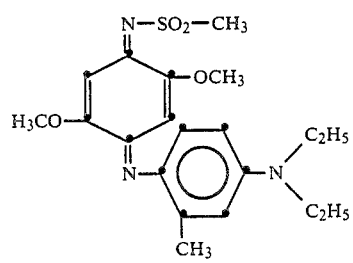
C.24
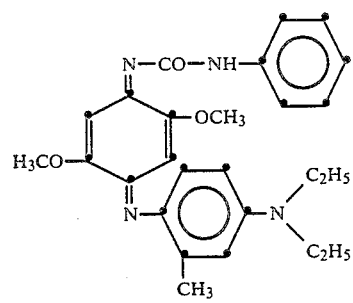
C.25
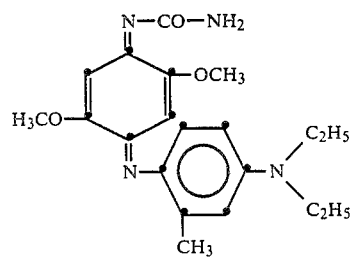

TABLE 1-continued
C.26 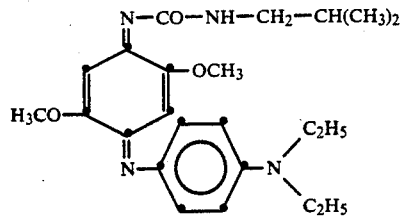
C.27 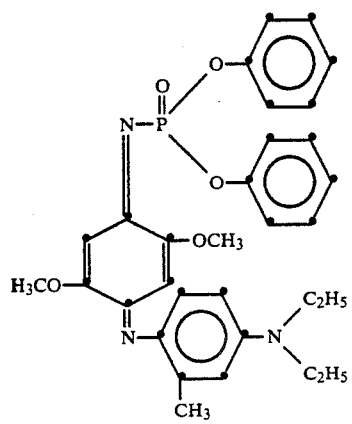
C.28 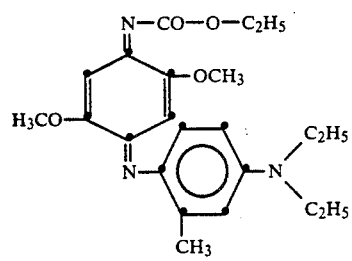
C.29 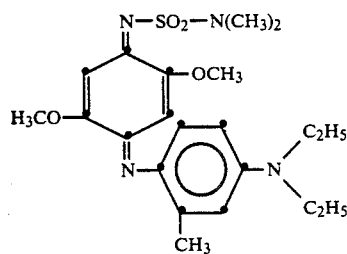
C.30 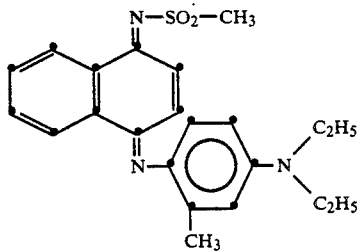
C.31 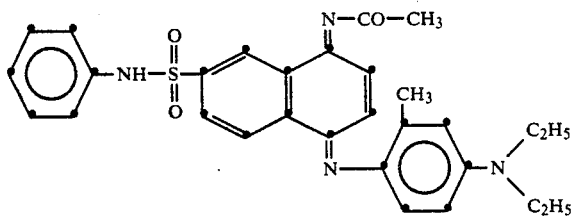

TABLE 1-continued

C.32
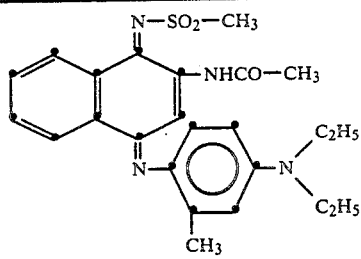

C.33
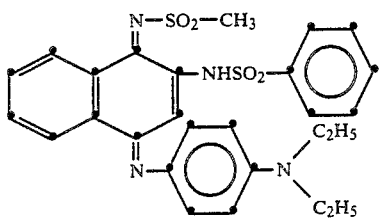

C.34
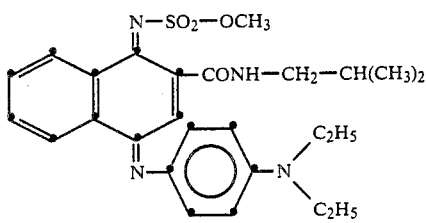

C.35
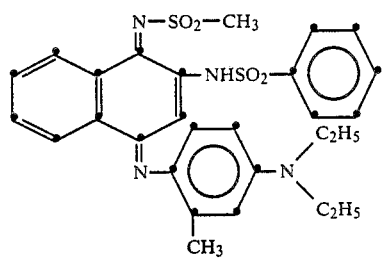

The cyan dyes for use according to the present invention can be prepared by condensation of a p-phenylenediamine compound or a nitroso-substituted aromatic compound with an appropriately N-substituted 1-aminonaphthalene or aniline or with N-unsubstituted 1-aminonaphthalene or aniline. The following preparations illustrate the synthesis of cyan dyes according to the present invention. Other dyes that can be used according to the present invention can be prepared in an analogous way.

PREPARATION 1

Cyan Dye C.01

(a) An amount of 10 g (55.7 mmol) of 1-aminonaphthalene hydrochloride is added to 50 ml of acetone. The mixture is placed on an icebath under nitrogen atmosphere and 9 ml of pyridine is added. Slowly 1 equivalent (4.3 ml) of methanesulphonyl chloride is added dropwise with stirring. Stirring is continued for 30 min. The mixture is then poured out in 200 ml of 1N hydrochloric acid with stirring. The precipitate is filtered, rinsed with demineralized water until neutral, and dried.

Yield: 8.8 g of 1-(N-methanesulphonyl)-aminonaphthalene.

(b) An amount of 2.0 g (9 mmol) of 1 1-(N-methanesulphonyl)-aminonaphthalene is dissolved in 20 ml of ethyl acetate. The solution is cooled to 0° C. under nitrogen atmosphere (first solution).

An amount of 4.8 g of sodium carbonate is dissolved in 15 ml of demineralized water and 10 ml of ethyl acetate and 2 g of N,N-diethyl-p-phenylenediamine monohydrochloride (1.1 equivalent) are added (second solution).

The aqueous layer is added immediately to the first solution. A solution of 14.8 g of potassium cyanoferrate (III) in 35 ml of demineralized water is made (third solution).

The organic layer of the second solution and the third solution are added separately and dropwise in about 2 h to the first solution with stirring. After the addition has been completed, stirring is continued for 30 min.

The reaction product is extracted from a mixture of equal volumes of methylene chloride and water, rinsed with water, then rinsed with a saturated aqueous sodium chloride solution until neutral. Finally the solution is dried over sodium sulphate, filtered, and concentrated by evaporation. Purification by column chromatography.

Yield: 3.0 g of cyan dye C.01.

PREPARATION 2

Cyan Dye C.02

The preparation of cyan dye C.02 is analogous to that described in Preparation 1, with the difference that p-tolylsulphonyl chloride is used instead of methanesulphonyl chloride.

PREPARATION 3

Cyan Dye C.06

The preparation of cyan dye C.06 is analogous to that described in Preparation 1 (b), with the difference that naphthsultam is used instead of 1-(N-methanesulphonyl)-aminonaphthalene.

PREPARATION 4

Cyan Dye C.07

(a) An amount of 10 g (56 mmol) of 1-aminonaphthalene hydrochloride is added to 50 ml of acetone and 9 ml (56 mmol) of pyridine is added to the mixture, which is then placed on an icebath. A volume of 6 ml (1 equivalent) of dimethylaminosulphonyl chloride is added. The mixture is then refluxed and allowed to stand for 2 h. The reaction product is then extracted with a mixture of ethyl acetate and 1N hydrochloric acid, washed with a saturated sodium chloride solution until neutral, dried over sodium sulphate, filtered, and concentrated by evaporation.

Yield: 11 g of 1-(N-dimethylaminosulphonyl)-aminonaphthalene.

(b) The preparation of cyan dye C.07 is analogous to that described in Preparation 1 (b), with the difference that 1-(N-dimethylaminosulphonyl)-aminonaphthalene is used instead of 1-(N-methanesulphonyl)-aminonaphthalene.

PREPARATION 5

Cyan Dye C.08

(a) The preparation of 5-(N-methanesulphonyl)-amino-1-naphthol is analogous to that described in Preparation 1 (a), with the difference that 5-amino-1-naphthol is used instead of 1-aminonaphthalene hydrochloride.

(b) An amount of 50 g (0.22 mol) of 5-(N-methanesulphonyl)-amino-1-naphthol is added to 63.8 g of potassium carbonate and 220 ml of ethanol. A volume of 27.4 ml of benzyl bromide is added dropwise. The mixture is stirred at room temperature overnight. The reaction mixture is poured out in 1 l of 1N hydrochloric acid with stirring. The reaction product is extracted with 1 l of ethyl acetate, rinsed with demineralized water, dried, and concentrated by evaporation. The oily residue is purified by column chromatography.

Yield: 23 g of 1-(N-methanesulphonyl)-amino-5-benzyloxy-naphthalene.

(c) The following step in the synthesis of cyan dye C.08 is analogous to that described in Preparation 1 (b), with the difference that 1-(N-methanesulphonyl)-amino-5-benzyloxy-naphthalene is used instead of 1-(N-methanesulphonyl)-aminonaphthalene.

PREPARATION 6

Cyan Dye C.14

(a) An amount of 10.0 g (55.7 mmol) of 1-aminonaphthalene hydrochloride is dissolved in 200 ml of ethyl acetate (first solution). An amount of 29.5 g of sodium carbonate is dissolved in 100 ml of demineralized water and 200 ml of ethyl acetate and 12.3 g of N,N-diethyl-p-phenylenediamine monohydrochloride (1.1 equivalent) are added (second solution).

The aqueous layer is added immediately to the first solution. A solution of 92.8 g of potassium cyanoferrate (III) in 300 ml of demineralized water is made (third solution).

The organic layer of the second solution and the third solution are added separately and dropwise in about 2 h to the first solution with stirring at room temperature. The reaction product is extracted with ethyl acetate, rinsed with water, then rinsed with a saturated aqueous sodium chloride solution until neutral. Finally the solution is dried over sodium sulphate, filtered, and concentrated by evaporation.

Yield: 16.0 g of 1-imino-4-[N-(p-diethylaminophenyl)-imino]-1,4-naphthoquinone.

(b) An amount of 2.0 g (6.6 mmol) of 1-imino-4-[N-(p-diethylaminophenyl)-imino]-1,4-naphthoquinone is dissolved in 20 ml of dichloroethane. Slowly 0.72 ml of phenyl isocyanate is added dropwise. The reaction mixture is stirred at room temperature for 5 min. The reaction product is concentrated by evaporation. Purification by column chromatography.

Yield: 3.6 g of cyan dye C.14.

PREPARATION 7

Cyan Dye C.15

The preparation of cyan dye C.15 is analogous to that of cyan dye C.14 as described in Preparation 6, with the difference that n-butyl isocyanate is used instead of phenyl isocyanate.

PREPARATION 8

Cyan Dye C.09

An amount of 2.0 g (6.6 mmol) of 1-imino-4-[N-(p-diethylaminophenyl)-imino]-1,4-naphthoquinone is dissolved in 20 ml of methylene chloride. A volume of 0.53 ml of pyridine is added to the solution. A volume of 1.36 ml of diphenyl chlorophosphate is added dropwise. The reaction mixture is stirred at room temperature for 5 min. A further amount of 0.13 ml of diphenylchlorophosponate is added to the reaction mixture. The reaction mixture is allowed to stand overnight. The reaction product is extracted with a mixture of equal volumes of methylene chloride and demineralized water, then rinsed with water until neutral, and dried over sodium sulphate. The product is concentrated by evaporation. Purification by column chromatography.

Yield: 2.0 g of cyan dye C.09.

PREPARATION 9

Cyan Dye C.05

(a) The preparation of 1-imino-2,5-dimethoxy-4-[N-(p-diethylaminophenyl)-imino]-1,4-quinone is analogous to that described in Preparation 6 (a), with the difference that 2,5-dimethoxyaniline is used instead of 1-aminonaphthalene hydrochloride.

(b) An amount of 2.0 g (6.4 mmol) of 1-imino-2,5-dimethoxy-4-[N-(p-diethylaminophenyl)-imino]-1,4-quinone is dissolved in 10 ml of methylene chloride. A volume of 0.89 ml of triethylamine and 0.5 ml of methanesulphonyl chloride is added. The reaction mixture is stirred at room temperature for 10 min. The reaction product is extracted with a mixture of equal volumes of methylene chloride and demineralized water, then rinsed with a saturated sodium chloride solution until neutral, and dried over sodium sulphate. The product is concentrated by evaporation. Purification by column chromatography.

Yield: 1.5 g of cyan dye C.05.

PREPARATION 10

Cyan Dye C.30

The preparation of cyan dye C.30 is analogous to that described in Preparation 1, with the difference that 2-amino-5-diethylamino-toluene hydrochloride is used instead of N,N-diethyl-p-phenylenediamine monohydrochloride.

The dye/binder layer is formed preferably by adding the dyes, the binder resin, and other optional components to a suitable solvent or solvent mixture, dissolving or dispersing the ingredients to form a composition that is applied to a support, which may have been provided first with an adhesive layer, and dried.

Appropriate solvents for dissolving or dispersing the cyan dyes of the present invention are i.a. ethyl methyl ketone, acetone, ethyl acetate, methyl acetate, propyl acetate, isopropyl acetate, butyl acetate, ethyl formiate, methyl propionate, ethyl propionate, diethyl ketone, diethyl carbonate, n-propyl methyl ketone, diisopropyl ether, dichloroethane, cyclohexane, ligroin, benzene, xylene, nitromethane, tetrahydrofuran, and toluene. Mixtures of these solvents can be used.

The composition comprising said cyan dyes, a binder resin, and at least one of the above solvents can be applied to the support by printing techniques such as a gravure process or by coating techniques.

The binder resin can be chosen from cellulose derivatives like ethyl cellulose, hydroxyethyl cellulose, ethylhydroxy cellulose, ethylhydroxyethyl cellulose, hydroxypropyl cellulose, methyl cellulose, cellulose acetate, cellulose acetate formate, cellulose acetate propionate, cellulose acetate butyrate, cellulose acetate pentanoate, cellulose acetate hexanoate, cellulose acetate heptanoate, cellulose acetate benzoate, cellulose acetate hydrogen phthalate, cellulose triacetate, and cellulose nitrate; vinyl-type resins like polyvinyl alcohol, polyvinyl acetate, polyvinyl butyral, polyvinyl pyrrolidone, polyvinyl acetoacetal, and polyacrylamide; polymers and copolymers derived from acrylates and acrylate derivatives, such as polyacrylic acid, polymethyl methacrylate, and styrene-acrylate copolymers; polyester resins; polycarbonates; poly(styrene-co-acrylonitrile); polysulfones; polyphenylene oxide; organosilicones such as polysiloxanes; epoxy resins and natural resins, such as gum arabic.

The binder resin can be added to the dye/binder layer in widely varying concentrations. In general, good results are obtained with 0.1 to 5 g of binder resin per m$^2$ of coated support.

In addition to the cyan dyes of the present invention any dye can be used in the dye/binder layer of the dye-donor element of the present invention provided it is transferable to the receiver sheet by the action of heat. Suitable dyes are those described in e.g. EP-A No. 209,990, EP-A No. 209,991, EP-A No. 216,483, EP-A No. 218,397, EP-A No. 227,095, EP-A No. 227,096, EP-A No. 229,374, EP-A No. 257,577, EP-A No. 257,580, JP No. 84/78894, JP No. 84/78895, JP No. 84/78896, JP No. 84/227,490, JP No. 84/227,948, JP No. 85/27594, JP No. 85/30391, JP No. 85/229,787, JP No. 85/229,789, JP No. 85/229,790, JP No. 85/229,791, JP No. 85/229,792, JP No. 85/229,793, JP No. 85/229,795, JP No. 86/41596, JP No. 86/268,493, JP No. 86/268,494, JP No. 86/268,495, and JP No. 86/284,489.

The dye/binder layer comprises from 0.05 to 1 g of dye per m$^2$.

The dye/binder layer can also comprise other components such as e.g. curing agents, preservatives, and other ingredients, which have been described exhaustively in EP-A No. 0,133,011, EP-A No. 0,133,012, and EP-A No. 0,111,004.

Any material can be used as the support for the dye-donor element provided it is dimensionally stable and capable of withstanding the temperatures involved, i.e. up to 400° C. over a period of up to 20 msec, and is yet thin enough to transmit heat supplied to one side through to the dye on the other side to effect transfer to the receiver sheet within such short periods, typically from 1 to 10 msec. Such materials include polyesters such as polyethylene therephthalate, polyamides, polyacrylates, polycarbonates, cellulose esters, fluorinated polymers, polyethers, polyacetals, polyolefins, polyimides, glassine paper, and condenser paper. Preference is given to a support comprising polyethylene terephthalate. In general, the support has a thickness of 2 to 30 μm. If desired, the support can be coated with an adhesive or subbing layer.

When the dye/binder layer comprises sequential repeating areas of different dyes like e.g. cyan, magenta, and yellow dye, it is preferably applied to the subbed support by printing techniques such as a gravure process. When the dye/binder layer is a monochrome cyan layer, it can also be applied to the support by common coating techniques.

A dye barrier layer comprising a hydrophilic polymer can be provided between the support and the dye/binder layer of the dye-donor element to improve the dye transfer densities by preventing wrong-way transfer of dye into the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethylene imine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP-A No. 0,227,091 and EP-A No. 0,228,065. Certain hydrophilic polymers e.g. those described in EP-A No. 0,227,091 also have an adequate adhesion to the support and the dye/binder layer, thus eliminating the need for a separate adhesive or subbing layer. These particular hydrophilic polymers used in one single layer in the dye-donor element thus perform a dual function, hence are referred to as dye barrier/subbing layers.

Preferably the reverse side of the dye-donor element can be coated with a slipping layer to prevent the printing head from sticking to the dye-donor element. Such a slipping layer would comprise a lubricating material such as a surface-active agent, a liquid lubricant, a solid lubricant, or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, and fluoroalkyl $C_2$-$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid esters. Suitable slipping layers have been described in e.g. EP-A No. 0,138,483, EP-A No. 0,227,090, U.S. Pat. No. 4,567,113, U.S. Pat. No. 4,572,860, and U.S. Pat. No. 4,717,711.

The dye-donor element can be used in sheet form or in the form of a continuous roll or ribbon.

The support of the receiver sheet to be used in combination with the dye-donor element may be a transparent film of e.g. polyethylene terephthalate, a polyether sulfone, a polyimide, a cellulose ester, and a polyvinyl alcohol-coacetal. The support may also be a reflecting one such as e.g. baryta-coated paper, polyethylene-coated paper, and white polyester i.e. white-pigmented polyester.

To avoid poor adsorption of the transferred dye to the support of the receiver sheet, this support must be coated with a special surface, generally known as dye-image-receiving layer, into which the dye can diffuse more readily. The dye image-receiving layer may comprise e.g. a polycarbonate, a polyurethane, a polyester, a polyamide, polyvinyl chloride, polystyrene-coacrylonitrile, polycaprolactone, and mixtures thereof. Suitable dye-image-receiving layers have been described in e.g. EP-A No. 0,133,011, EP-A No. 0,133,012, EP-A No. 0,144,247, EP-A No. 0,227,094, and EP-A No. 0,228,066.

UV-absorbers and/or antioxidants may be incorporated into the dye-image-receiving layer for improving the fastness to light and other stabilities of the recorded images.

It is generally known to use a releasing agent that aids in separating the receiver sheet from the dye-donor element after transfer. Solid waxes, fluorine- or phosphate-containing surfactants, and silicone oils can be used as releasing agent. A suitable releasing agent has been described in e.g. EP-A No. 0,133,012, JP No. 85/19138, and EP-A No. 0,227,092.

When the dye transfer is performed for but one single colour, a monochrome cyan dye transfer image is obtained, which consists of at least one dye according to the present invention. A multicolour image can be obtained by using a dye-donor element containing three or more primary colour dyes, one of which consists of at least one cyan dye according to the present invention, and sequentially performing the process steps described above for each colour. The above sandwich of dye-donor element and receiver sheet is then formed on three or more occasions during the time heat is being supplied by the thermal printing head. After the first dye has been transferred, the elements are peeled apart. A second dye-donor element or another area of the dye-donor element with a different dye area is then brought in register with the receiver sheet and the process is repeated. The third colour and optionally further colours are obtained in the same manner.

In addition to thermal printing heads, laser light, infrared flash, or heated pins can be used as a heat source for supplying the heat energy. Thermal printing heads that can be used to transfer dye from the dye-donor elements of the present invention to a receiver sheet are commercially available. Suitable thermal printing heads are e.g. a Fujitsu Thermal Head (FTP-040 MCS001), a TDK Thermal Head F415 HH7-1089, and a Rohm Thermal Head KE 2008-F3.

It is believed that the cyan 1,4-quinonediimines of the present invention, whose hydrogen atom at the 1-imino function has been replaced by a substituted phosphono group, a substituted phosphinyl group, a substituted sulphonyl group, a sulpho group, a substituted sulpho group, a sulphamoyl group, or a substituted sulphamoyl group, and whose hydrogen atom at the 4-imino function has been substituted by a p-aminoaryl group or a substituted p-aminoaryl group are novel cyan dyes. In addition to their use in thermal dye transfer methods as described herein, these novel cyan dyes can, of course, find any other suitable use as a dye such as in a layer making part of a photographic material comprising at least one light-sensitive silver halide emulsion layer or in non-photographic materials such as glass, fabrics, and synthetic materials. These 1,4-quinonediimine dyes are of good cyan hue and they have a high stability to light. In case suitable water-solubilizing groups such as e.g. sulpho and carboxy groups are introduced into the molecule of the dyes, they can also be used in paints, lacquers, varnishes, inks and the like.

Preferred novel cyan dyes correspond to the above general formula I, wherein $R^5$ is a monovalent function corresponding to one of the following formulae:

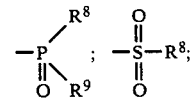

wherein $R^8$ and $R^9$ each have one of the above defined significances.

The following example illustrates the present invention.

EXAMPLE

A dye-donor element was prepared as follows.

To avoid sticking of the dye-donor element to the thermal printing head the rear side of a 5 μm polyethylene terephthalate support was provided first with a solution for forming a slipping layer, said solution comprising 10 g of co(styrene/acrylonitrile) comprising 104 styrene units and 53 acrylonitrile units, which copolymer is sold under the trade mark LURAN 378 P by BASF AG, D-6700 Ludwigshafen, West Germany, 10 g of a 1% solution of polysiloxane polyether copolymer sold under the trade mark TEGOGLIDE 410 by TH. GOLDSCHMIDT AG, D-4300 Essen 1, Goldschmidtstrasse 100, West Germany, and sufficient ethyl methyl ketone solvent to adjust the weight of the solution to a total of 100 g. From this solution a layer having a wet thickness of 15 μm was printed by means of a gravure press. The resulting layer was dried by evaporation of the solvent.

An amount of 50 mg of cyan dye as identified in Table 2 hereinafter and a binder resin in an amount, both as defined in the same Table 2, were dissolved in 10 ml of ethyl methyl ketone. The resulting ink-like composition was coated by means of a doctor knife on the front side of the polyethylene terephthalate support at a wet layer thickness of 100 μm and dried.

A commercially available Hitachi material (VY-S100A-paper ink set) was used as receiver sheet.

The dye-donor element was printed in combination with the receiver sheet in a Hitachi colour video printer VY-100A.

The receiver sheet was separated from the dye-donor element and the density (Dmax) of the recorded cyan dye image was measured in transmission by means of a Macbeth densitometer RD919 in Status A mode.

The extinction coefficient and λmax of the dye were determined in methanol and the stability to light of the dye was tested as follows. The receiver sheet carrying transferred dye was divided into 3 strips. The first strip was exposed for 5 h, the second for 15 h, and the third for 30 h to white light and ultraviolet radiation in a XENOTEST (trade name) type 50 apparatus of Hanau Quartzlampen GmbH, Hanau, W. Germany. The density was measured again and the loss of density from Dmax in percent was derived.

The side absorption of the dye was measured with the aid of a red, a green, and a blue filter.

These experiments and measurements were repeated for each of the dyes identified in Table 2. The results obtained are listed therein. All dyes were dissolved in ethyl methyl ketone as mentioned above, except for dye C.05, which was dissolved in dichloroethane.

TABLE 2

| Dye | Binder | Amount (mg) | Dmax | Extinction coefficient | λ max (nm) | Side absorption red | Side absorption green | Side absorption blue | % Density loss 5 h | % Density loss 15 h | % Density loss 30 h |
|---|---|---|---|---|---|---|---|---|---|---|---|
| C.01 | CSA | 50 | 179 | 23987 | 679 | 150 | 45 | 33 | 7 | 14 | 43 |
| C.02 | CSA | 50 | 109 | 26283 | 694 | 109 | 40 | 43 | 3 | 9 | 21 |
| C.04 | CN | 20 | 170 | 24677 | 694 | 150 | 45 | 43 | 5 | 11 | 22 |
| C.05 | CAB | 50 | 148 | 26491 | 659 | 150 | 58 | 36 | 11 | 36 | 86 |
| C.06 | CSA | 50 | 188 | 31104 | 678 | 150 | 41 | 42 | 6 | 7 | 10 |
| C.07 | CSA | 50 | 178 | 23981 | 665 | 150 | 49 | 30 | 8 | 11 | 18 |
| C.09 | CSA | 50 | 191 | 31130 | 686 | 150 | 47 | 31 | — | — | — |
| C.09 | VCV | 50 | 212 | 31130 | 686 | 150 | 47 | 31 | 5 | 9 | 20 |
| C.10 | CAB | 50 | 139 | 20956 | 654 | 150 | 61 | 24 | 6 | 19 | 55 |
| C.14 | CN | 20 | 108 | 13775 | 601 | 150 | 100 | 43 | 26 | 55 | — |

CSA stands for co(styrene/acrylonitrile) comprising 104 styrene units and 53 acrylonitrile units, which copolymer is sold under the trade mark LURAN 378 P by the above-mentioned BASF AG CN stands for cellulose nitrate CAB stands for cellulose acetate butyrate having an acetyl content of 29.5% and a butyryl content of 17% (Tg 161° C.; melting range: 230°–240° C.)

VCV stands for co(vinyl chloride/vinyl acetate) (85:15) sold under the trade mark SOLVIC 513 P by SOLVAY & CIE. S.A., rue du Prince Albert 33, B-1050, Brussels.

What is claimed is:

1. Dye-donor element for use according to thermal dye transfer methods, said element comprising a support having thereon a dye/binder layer comprising a cyan dye carried by a polymeric binder resin, wherein said cyan dye is a 1,4-quinonediimine or 1,4-quinonediimine carrying on the quinone ring structure a fused on aromatic ring system, alicyclic ring system, or heterocyclic ring system, the hydrogen atom of the 1-imino function being substituted by a carboxylic-acid derived acyl group, an alkyl ester group, an aryl ester group, a carbamoyl group, a substituted phosphono group, a substituted phosphinyl group, a substituted sulphonyl group, a sulpho group, or a sulphamoyl group, the hydrogen atom of the 4-imino function being substituted by a p-aminoaryl group.

2. A dye-donor element according to claim 1, wherein said cyan dye has the following general formula I:

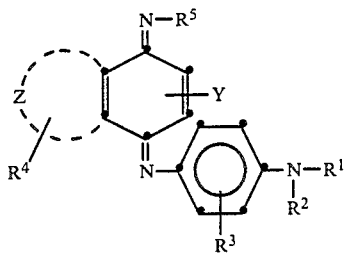

wherein:
each of $R^1$ and $R^2$ represents a $C_1$-$C_8$ alkyl group, a cycloalkyl group, or an aryl group, or $R^1$ and $R^2$ together represent the atoms necessary for completing a heterocyclic nucleus, or $R^1$ and/or $R^2$ together with $R^3$ represent the atoms necessary for completing a heterocyclic nucleus fused-on, $R^1$ and $R^2$ being same or different, $R^3$ is a substituent in ortho- or meta-position and is hydrogen, a halogen atom, a $C_1$-$C_8$ alkyl group, a $C_1$-$C_8$ alkyloxy group, nitro, cyano, an acylamino group, a —CONH—R' group, or a —SO$_2$NH—R' group, in which R' stands for an alkyl group, a cycloalkyl group, or an aryl group, or $R^3$ together with $R^1$ and/or $R^2$ represents the atoms necessary for completing a heterocyclic nucleus fused-on, Z represents hydrogen atoms or represents the atoms necessary for completing a fused on aromatic ring system, alicyclic ring system, or heterocyclic ring system, $R^4$ is hydrogen, a halogen atom, a $C_1$-$C_8$ alkyl group, a $C_1$-$C_8$ alkyloxy group, nitro, cyano, a —NHCO—R" group, a —NHSO$_2$—R" group, a —CONH—R" group, a —SO$_2$NH—R" group, or a —SO$_3$—R" group, in which R" stands for an alkyl group, a cycloalkyl group, or an aryl group, Y is hydrogen, a halogen atom, cyano, a $C_1$-$C_8$ alkyl group, a $C_1$-$C_8$ alkyloxy group, a —NHCO—$R^6$ group, a —NHCOO—$R^6$ group, a —NHCON—$R^6R^7$ group, a —SO$_2$NH—$R^6$ group, a —NHSO$_2$—$R^6$ group, a —COOR$^6$ group, or a —CON—$R^6R^7$ group, $R^6$ standing for a $C_1$-$C_8$ alkyl group, a cycloalkyl group, or an aryl group, $R^7$ standing for a $C_1$-$C_8$ alkyl group, a cycloalkyl group, or an aryl group; and $R^6$ and $R^7$ having a same or different meaning, $R^5$ is a monovalent function corresponding to one of the following formulae:

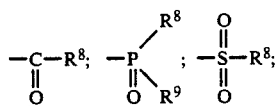

wherein:
$R^8$ is a $C_1$-$C_8$ alkyl group, a cycloalkyl group, an aryl group, an alkenyl group, an aralkyl group, a heterocyclic group, an alkyloxy group, an aryloxy group, an alkylthio group, an arylthio group, or an amino group, or $R^8$ and $R^4$ together complete a heterocyclic ring fused-on, and
$R^9$ is a $C_1$-$C_8$ alkyl group, a cycloalkyl group, an aryl group, an alkenyl group, an aralkyl group, a heterocyclic group, an alkyloxy group, an aryloxy group, an alkylthio group, an arylthio group, or an amino group; and $R^8$ and $R^9$ have a same or different meaning or $R^8$ and/or $R^9$ stand for the atoms necessary to complete a five-membered or six-membered heterocyclic ring.

3. A dye-donor element according to claim 1, wherein the reverse side of said dye-donor element is coated with a slipping layer comprising a lubricating material.

4. A dye-donor element according to claim 1, wherein a dye barrier layer is provided between the support and the dye/binder layer.

5. A dye-donor element according to claim 1, wherein said support comprises polyethylene terephthalate.

6. A dye-donor element according to claim 1, wherein it has sequential repeating areas of different dyes.

* * * * *